(12) United States Patent
Robert Jose et al.

(10) Patent No.: US 12,518,092 B2
(45) Date of Patent: Jan. 6, 2026

(54) SYSTEMS AND METHODS TO GENERATE CONTEXTUAL BASED ACTIONS

(71) Applicant: Adeia Guides Inc., San Jose, CA (US)

(72) Inventors: Jeffry Copps Robert Jose, Tamil Nadu (IN); Ankur Anil Aher, Maharashtra (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 462 days.

(21) Appl. No.: 17/502,384

(22) Filed: Oct. 15, 2021

(65) Prior Publication Data

US 2023/0124889 A1   Apr. 20, 2023

(51) Int. Cl.
| | | |
|---|---|---|
| *G06F 17/00* | (2019.01) | |
| *G06F 3/04817* | (2022.01) | |
| *G06F 40/226* | (2020.01) | |
| *G06F 40/30* | (2020.01) | |
| *G10L 15/26* | (2006.01) | |

(52) U.S. Cl.
CPC ........ *G06F 40/226* (2020.01); *G06F 3/04817* (2013.01); *G06F 40/30* (2020.01); *G10L 15/26* (2013.01)

(58) Field of Classification Search
CPC .... G06F 40/30; G06F 40/226; G06F 3/04817; G10L 15/26
USPC .................................................. 700/94; 704/9
See application file for complete search history.

(56) References Cited

U.S. PATENT DOCUMENTS

| | | | |
|---|---|---|---|
| 10,224,035 B1* | 3/2019 | Koenig | .................... G06F 40/20 |
| 10,896,295 B1* | 1/2021 | Shenoy | ................. G10L 15/187 |
| 10,978,060 B2 | 4/2021 | Azam et al. | |
| 2014/0273979 A1 | 9/2014 | Van Os et al. | |
| 2018/0061401 A1 | 3/2018 | Sarikaya et al. | |
| 2018/0330731 A1 | 11/2018 | Zeitlin et al. | |
| 2018/0336904 A1 | 11/2018 | Piercy et al. | |
| 2019/0230070 A1* | 7/2019 | Isaacson | ............. H04W 12/084 |
| 2020/0341804 A1* | 10/2020 | Rakshit | .................... G06N 5/02 |

FOREIGN PATENT DOCUMENTS

| | | |
|---|---|---|
| EP | 2575128 A2 | 4/2013 |
| WO | 2018217014 A1 | 11/2018 |

* cited by examiner

*Primary Examiner* — Paul C Mccord
(74) *Attorney, Agent, or Firm* — HALEY GUILIANO LLP

(57) ABSTRACT

Systems and methods for providing contextual based actions based on a natural language input are disclosed. The method comprises: receiving, on a media device, a natural language input; determining, based on the natural language input, a first context of the natural language input; and determining, based on the first context, a first action. a dynamic action button is generated and configured to be selected by a user to carry out an action, and in response to the user selecting the dynamic action button, the systems and methods describe carrying out the first action.

20 Claims, 11 Drawing Sheets

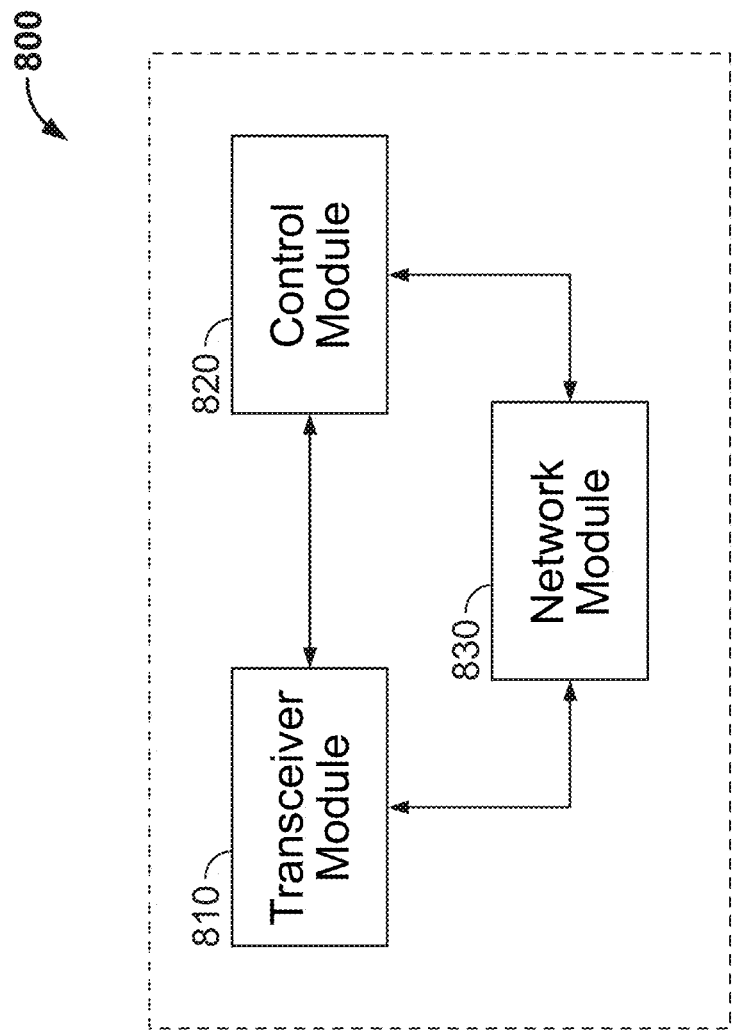
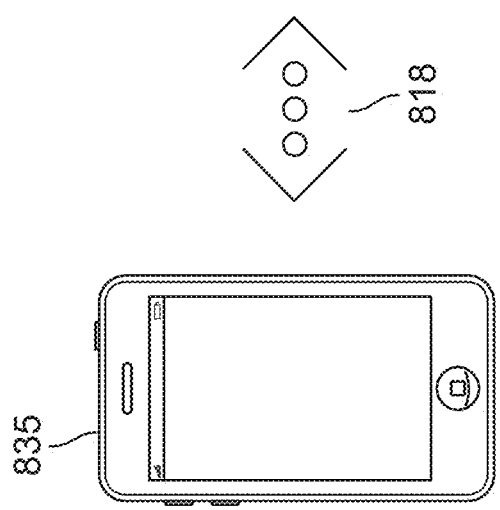
FIG. 8

SYSTEMS AND METHODS TO GENERATE CONTEXTUAL BASED ACTIONS

BACKGROUND

The present disclosure relates to techniques for providing contextually relevant actions based on spoken information, such as to provide call-back, messaging, scheduling, ordering, or navigation to users of a voice-based messaging system. In addition, verification processes of spoken information are also provided and, in some instances, prioritized.

SUMMARY

While people are increasingly using voice capabilities of computing devices to communication in different ways, voice-based functionality of telephones continues to be commonly used for a variety of purposes, including to obtain information of various types and for sending and receiving voice messages and voicemail. Automated digital assistants can provide a beneficial interface between human users and electronic devices. Such digital assistants can allow users to interact with devices or systems using natural language in spoken and/or text forms. For example, a user can provide a speech input including a user request to a digital assistant operating on an electronic device. The digital assistant can interpret the context from the speech input and operationalize the context into one or more tasks. The tasks can be performed by executing one or more services of the electronic device, and a relevant output responsive to the user request can be returned to the user. Typically, a conventional automated digital assistant of an electronic device must rely on a backend (e.g., server-side) component to function, often due to computational limitations of the electronic device. As an example, voice assistants are frequently used to obtain weather forecasts and scheduling information for designated individuals, enhanced directory assistance services exist to provide a variety of types of additional information to telephone users, such as movie listings, weather reports, sports scores, traffic reports, etc.

Popular mobile phone applications such, WhatsApp, iMessage, Messenger, Slack, and all such social media platforms started supporting audio messaging. Other types of systems may similarly provide a variety of other types of functionality using natural language inputs from users, such as voice message recording and/or forwarding services (e.g., to record a voice message to later be provided to one or more designated recipients), transcription services (e.g., to record voice-based information that will later be manually and/or automatically converted into text), etc. While various services and systems thus exist for telephone users to obtain some types of voice-based information, the context of the audio is not leveraged to provide a personalized and effective action to aid the user to carryout tasks.

In a first approach there is provided a method for providing contextual based actions based on a natural language input. The method further comprises: receiving, on a media device, a natural language input; determining, based on the natural language input, a first context of the natural language input; determining, based on the first context, a first action and a second action; calculating a first priority score of the first action; calculating a second priority score of the second action; generating for display on the media device a dynamic action button configured to be selected by a user to carry out an action; and configuring the dynamic action button to carry out the action with the highest priority score after being selected by a user of the media device.

In some examples, the method further comprises verifying the content of the natural language input based on at least one of: data on the media device, data stored on a server, or data from a publicly available resource.

In some examples, the method further comprises providing the user with survey information based on the first action and second action; receiving survey feedback comprising an indication of user preference of the first action or second action; associating the indication of user preference of the first action or second action with the first context; and assigning a weighting to the first context.

In some examples, the method further comprises providing the action with the lowest priority score to another media device.

In some examples, the method further comprises providing a text string based on the natural language input, wherein the first context is determined based on the text string. In some examples, the method further comprises using one or more characters of the text string in the first action.

In some examples, the method further comprises selecting a plurality of keywords from the text string; and searching the media device for associated data based on the text string, wherein the associated data is used in determining the first context of the natural language input.

In some examples, the one or more keywords relate to: weather information, sport updates, traffic information, place information, navigation information, news updates, stock updates, chronological information, scheduling information, location information, entertainment information, an IoT device, or food related information.

In some examples, the keywords comprise at least one expression being associated with one or more pieces of promotional material. Moreover, in some examples, the method further comprises selecting a piece of promotional material based on the expression, and sending the selected piece of promotional material to the user in an electronic message.

In some examples, the method further comprises flagging one or more portions of the natural language input associated with an action and generating for display on the media device a visual indicator at each flagged portion, configured to be selected by a user to review the flagged portion.

In some examples, the method further comprises generating for display on the media device a dynamic action button, configured to be selected by the user to carry out an action, and wherein the dynamic action button changes according to the currently selected flagged portion.

In another approach, there is provided a media device, comprising a control module, a transceiver module, and a network module, configured to: receive, on the media device, a natural language input; determine, based on the natural language input, a first context of the natural language input; determine, based on the first context, a first action and a second action; calculate a first priority score of the first action; calculate a second priority score of the second action; generate for display on the media device a dynamic action button configured to be selected by a user to carry out an action; and configure the dynamic action button to carry out the action with the highest priority score after being selected by a user of the media device.

In another approach, there is provided a system for providing contextual based action based on a natural language input, the system comprising: means for receiving, on a media device, a natural language input; means for determining, based on the natural language input, a first context of the natural language input; means for determining, based on the first context, a first action and a second action; means for calculating a first priority score of the first action; means for calculating a second priority score of the second action; means for generating for display on the media device a dynamic action button configured to be selected by a user to carry out an action; and means for configuring the dynamic action button to carry out the action with the highest priority score after being selected by a user of the media device.

In another approach, there is provided a non-transitory computer-readable medium having instructions encoded thereon for carrying out a method, the method comprising: receiving, on a media device, a natural language input; determining, based on the natural language input, a first context of the natural language input; determining, based on the first context, a first action and a second action; calculating a first priority score of the first action; calculating a second priority score of the second action; generating for display on the media device a dynamic action button configured to be selected by a user to carry out an action; and configuring the dynamic action button to carry out the action with the highest priority score after being selected by a user of the media device.

In another approach there is provided an alternate method for providing contextual based actions based on a natural language input. The method comprises: receiving, on a media device, the natural language input; determining, based on the natural language input, a first context of the natural language input; and determining, based on the first context, a first action; generating for display on the media device a dynamic action button configured to be selected by a user to carry out an action; in response to a user selection of the dynamic action button, carrying out the first action.

Advantages of the present disclosure allow the user to take an appropriate action based on the context of a voice input, voice message, or voicemail sent or received on a media device. In this way, a digital assistant of an electronic device is able to more efficiently select and perform an action or task determined to best fulfill a user need.

Selecting and performing tasks in this manner enhances operability of the electronic device by allowing for more reliable operation of the digital assistants of the electronic device (e.g., by better interpreting and performing tasks in response to user need) which, additionally, reduces power usage and improves battery life of the device by enabling the user to use the device more quickly and efficiently.

BRIEF DESCRIPTION OF THE DRAWINGS

The above and other objects and advantages of the disclosure will be apparent upon consideration of the following detailed description, taken in conjunction with the accompanying drawings, in which:

FIG. 8 illustrates an exemplary media transmission device, in accordance with some embodiments of the disclosure.

DETAILED DESCRIPTION

In the following description of examples, reference is made to the accompanying drawings in which are shown by way of illustration specific examples that can be practiced. It is to be understood that other examples can be used and structural changes can be made without departing from the scope of the various examples.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 1:
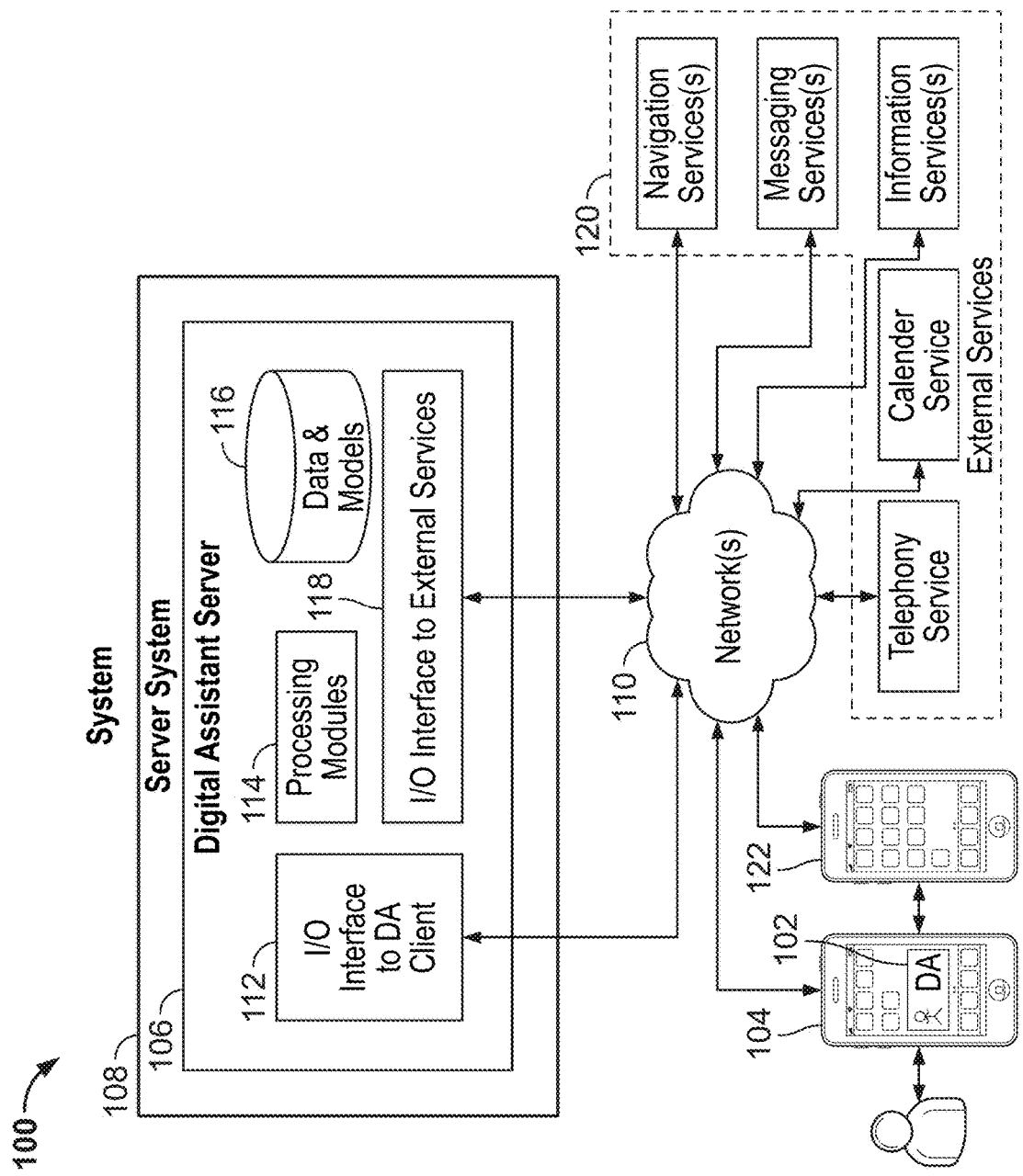
FIG. 1 illustrates a block diagram illustrating a system and environment for implementing a digital assistant, in accordance with embodiments of the present disclosure.

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to determine a context, and determine actions based on the context. For example, to determine an action, the system performs one or more of the following: determining a context of a natural language input; identifying a task flow with steps and parameters designed to accomplish the context; calculating priority scores for one or more actions; providing a text string based; searching a media device for associated data; executing a task flow or method by invoking programs, methods, services, APIs, or the like; and providing surveys to the user (e.g., in a multiple choice form).

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Send a message to my partner." In response, the digital assistant can acknowledge the request by asking "what would you like to send?", to which the user can further engage with.

However, in the above cases, the user is asking a specific question, or giving a specific answer, and the user is directly engaging with the assistant. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc. In particular, digital assistants also interact with many of the applications on the user's device, such as a smartphone, tablet or other such media device.

Accordingly, in some examples, the digital assistant, already possessing natural language interpretation functionality, is utilized to interpret voice memos, voice messages, and the like from mobile phone applications. For example, after receiving or detecting a natural language input, the digital assistant can determine, based on the natural language input, a first context of the natural language input, and determine, based on the first context, a first action. In some examples, in response to a user input, the digital assistant carries out the first action.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, upon receipt of a natural language based input, such as a voicemail message, a suggested list of actions is generated for the user, based on the context of the voicemail message, such as tone, choice of language, urgency, length of message, and the like. The determined context of the voice based message may be stored as metadata that summarizes the context of the voicemail for determining a plurality of further actions, creating indicators at points on a timeline of the voicemail, creating word maps, and/or creating notification.

The outputted metadata of the system (e.g., the context and actions), can be used as an input to further enhance the actions that can be taken, extracting intelligence from the voice message using predefined and trained models. For example, a doctor's office may have called a patient and left a voicemail asking the patient to call back to schedule their next physical exam. A suggested list of actions for this particular voicemail could be the automatic extraction of the phone number or automatically suggesting a phone number if the voice message does not include the phone number (e.g., based on the name of the clinic, or based on stored contact info on the user's phone, etc.). Other metadata can be displayed about the voice message, such as a 'nurse' icon to indicate that it is the doctor's office that left the voicemail, as well as a first action of the message, such as "Schedule annual check-up." A dynamic action button, presented to the user, is configured to automatically represent the first action (or an action with the highest priority), such as the "Schedule annual check," which may result in automatically calling the doctor's office in response to a user selecting the button, or booking an appointment at the doctor's office through an application on the user's media device.

Returning to FIG. 1, in some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the context based on natural language input. Further, one or more processing modules 114 perform task execution based on inferred user context. In some examples, DA server 106 communicates with external services 120 through network(s) 110 for task completion or information acquisition. I/O interface to external services 118 facilitates such communications.

User device 104 can be any suitable electronic device. In some examples, user device is a portable multimedia device (e.g., device 600 or 800 described below with reference to FIGS. 6 and 8), a multifunctional, or a personal electronic device. A portable multifunctional device is, for example, a mobile telephone that also contains other functions, such as PDA and/or music player functions. Other examples of portable multimedia devices include, without limitation, laptop or tablet computers. Further, in some examples, user device 104 is a non-portable multifunctional device. In particular, user device 104 is a desktop computer, a game console, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to device 835 described below with reference to FIG. 8. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and return relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

Figure 2A:
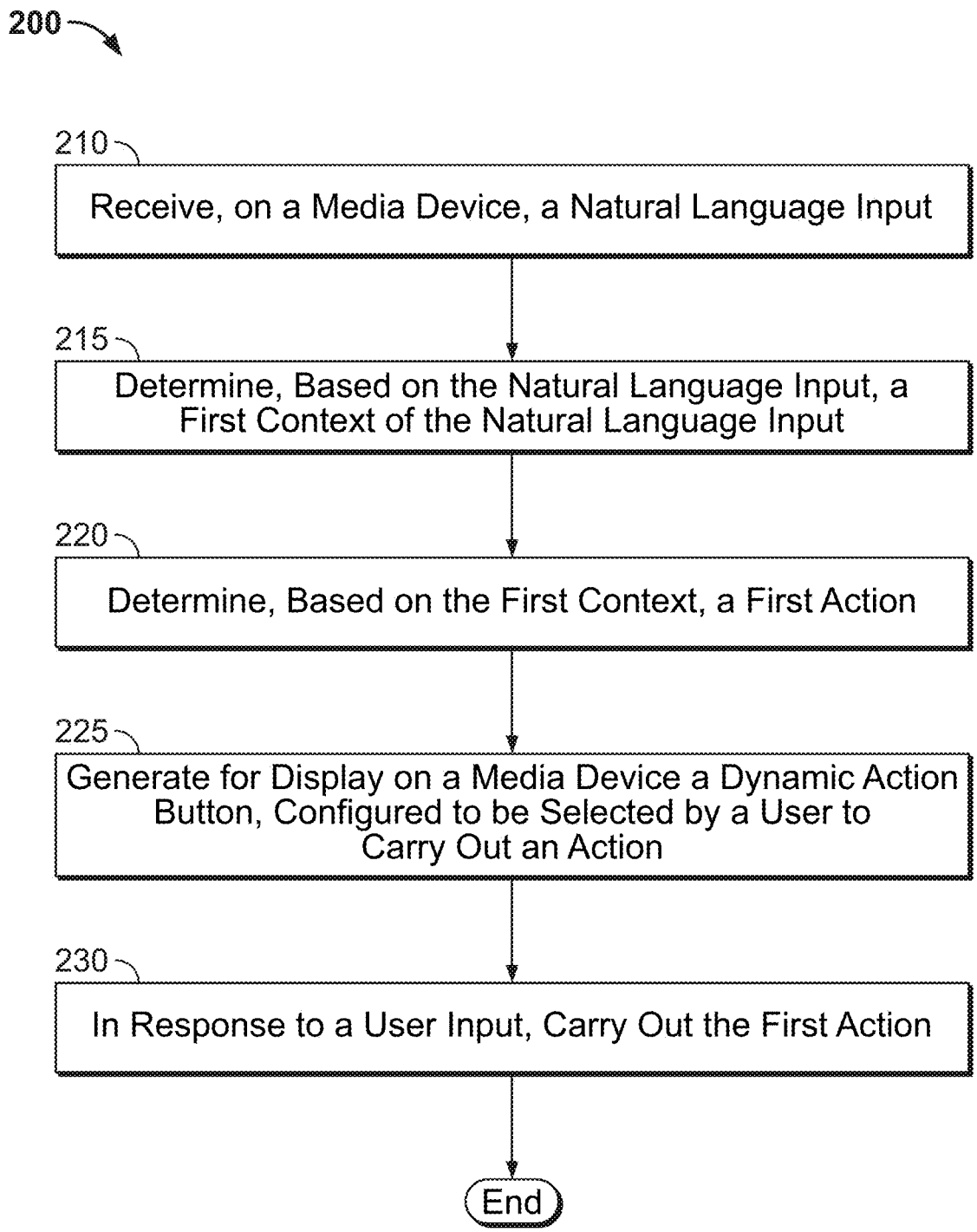
FIGS. 2A and 2B illustrate exemplary flowcharts of the processing involved in carrying out an action based on the context of a natural language input, in accordance with some embodiments of the disclosure.

FIG. 2A illustrates an exemplary flowchart of the processing involved in determining an action based on a context of a natural language input, in accordance with some embodiments of the disclosure. The process results in recommending and carrying out an action based on a natural language input.

Process 200 begins at step 210. At step 210, the system receives a natural language input, on a media device. For example, a voicemail message may be received on a user's smartphone (e.g., via landline phone devices, mobile phone devices, other desktop voice input devices, etc.). In other examples, the user receives a voice message on a messaging application, such as WhatsApp or Messenger.

At step 215, the system determines a first context of the natural language input based on the natural language input. In some examples, natural language processing module 732 (as described below with reference to FIG. 7A) is implemented using one or more machine learning mechanisms (e.g., neural networks). In particular, the one or more machine learning mechanisms are configured to receive a text string that represents the natural language input and determine contextual information associated with the text string thereafter.

At step 220, the system determines a first action based on the first context. Continuing on the above example, based on the text string and the associated contextual information, the one or more machine learning mechanism may be configured to determine actions. Natural language processing module 732 of FIG. 7A can select one or more actions from the context of the natural language input. In some examples, an ontology (e.g., ontology 760) is also used to select the one or more contexts from the set of candidate actionable contexts, as will be described below with reference to FIG. 7B.

At step 225, the system generates for display on a media device a dynamic action button, configured to be selected by a user to carry out an action. In some examples, without the receipt of a natural language input, the button is not generated for display. However, in some examples, the button will always be present in a graphical user interface (GUI) on a media device, but may be inactive without the receipt of a natural language input. At step 230, the system carries out the first action in response to a user selection of the dynamic action button.

Figure 2B:
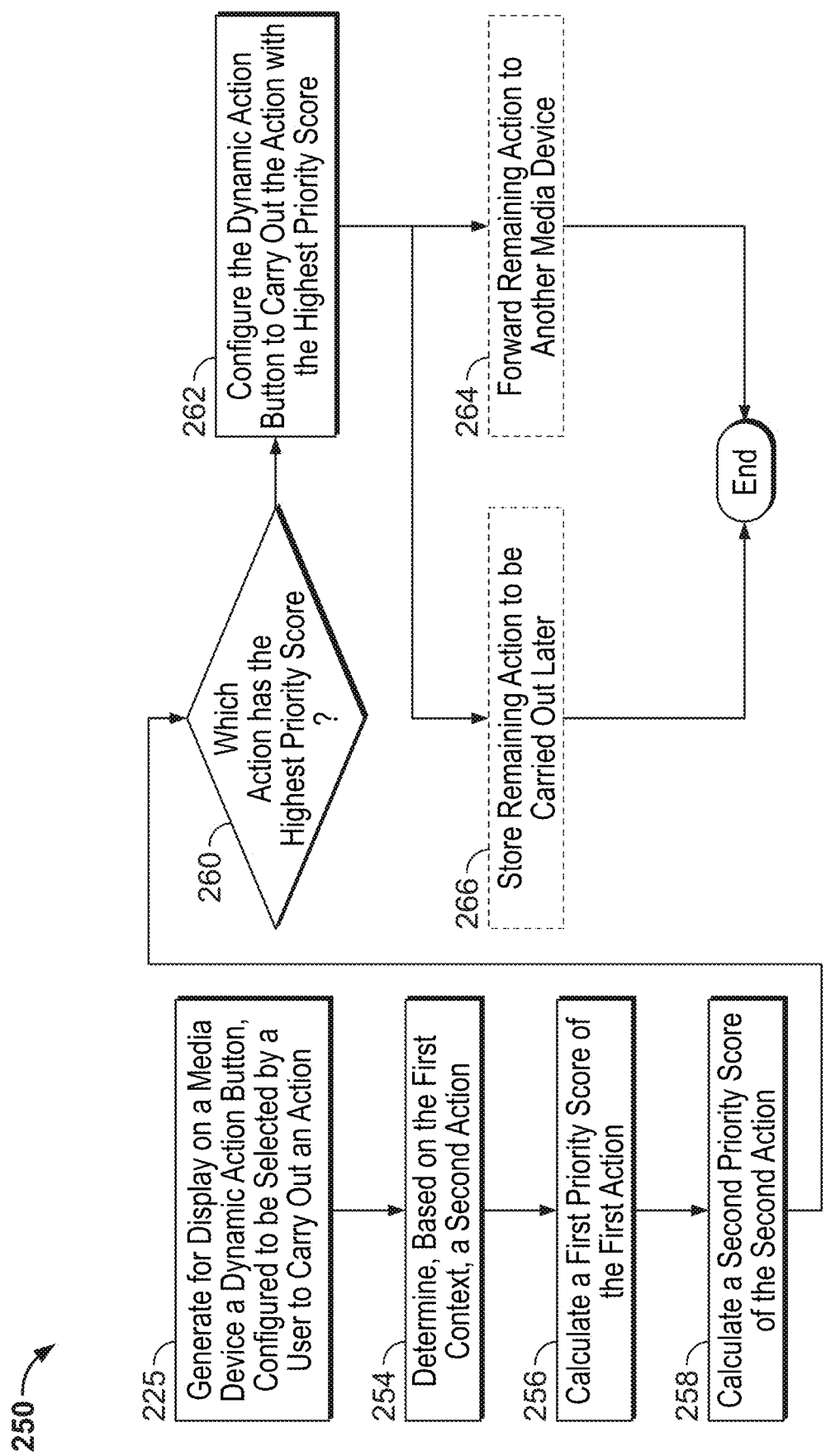

FIG. 2B illustrates an exemplary flowchart of the processing involved in calculating a priority score of an action, in accordance with some embodiments of the disclosure. The process results in recommending and carrying out an action of a plurality (e.g., one or more) of actions based on a priority of said actions.

Process 250 may begin after step 225 of process 200. As described above, a process such as process 200 or 250 generates for display on a media device a dynamic action button, configured to be selected by a user to carry out an action. In some examples, without the receipt of a natural language input, the button is not generated for display. However, in some examples, the button will always be present in a graphical user interface (GUI) on a media device, but may be inactive without the receipt of a natural language input.

At step 254, the system determines, based on the first context, a second action. Similar to step 220 of process 200, based on the text string and the associated contextual information, one or more machine learning mechanisms may be configured to determine actions and, in some examples, priority scores of a set of candidate actions. In some examples, the text string is not required to analyse the natural language input to determine context and/or actions. In particular, recently, artificial intelligence is being developed to exclusively operate in speech-to-speech interactions between machine (e.g., assistant) and user. It should be understood that all instances of natural language inputs, whether the natural language input is converted into a string text or not, is considered within the scope of the present disclosure.

At step 256, the system calculates a first priority score of the first action. At step 258, the system calculates a second priority score of the second action. In some examples, the calculation of the priority score is based on the overall intent and context of the message (e.g., crying, panic, etc.). For example, in distress users may have a particular tone of voice that machine learning models can recognize as such. In addition, keywords from the natural language input can be recognised, such keywords may have a higher priority than others. For example, terms such as "call me back it is urgent," "car accident," "hospital," "sick," "surgery," and the like can all add to the priority score of the natural language input.

The data and model database 116 stored in digital assistant server 106 of FIG. 1 may comprise a list of priority words and phrases to generate a priority score. For example, some keywords and phrases may be assigned a weighting, increasing the priority of the associated action.

At step 260, the system determines which action has the highest priority score. At step 262, the system configures the dynamic action button to carry out the action with the highest priority score. Put another way, the more urgent actions, as defined by the highest priority score, are prioritized and selected to configure the dynamic action button to carry out said action.

For example, in response to the first priority score being greater than the second priority score, configuring the dynamic action button to carry out the first action. As another example, in response to the second priority score being greater than the first priority score, configuring the dynamic action button to carry out the second action.

In some examples, some natural language inputs might not have an action associated with them and as such can be an indicator to the user that the message is not important. For example, a voicemail message might be a reminder for an upcoming doctor's appointment, in which case there's no action to be generated, but an automatic reminder message can be created or a calendar entry can be automatically created if the event is not on the user's calendar.

In another example, a voice message that is deemed high priority or urgent can override existing notification settings in order to alert the recipient. For example, the user can be alerted via special icons or notifications, as shown and described in more detail in FIG. 6.

After step 262, the process 250 may end, may move on to step 264, or may move on to step 266. At step 264, the system forwards the remaining action to another media device. In some examples, the system may forward to the remaining action (e.g., the action that was not selected or with the second highest priority) to another media device. The other media device may be the user's device, or may be another user's device. For example, after selecting the first action to configure the dynamic action button, the system may forward the second action to a second user's device to carry out a complimentary action to the first action.

At step 266, the system stores remaining action to be carried out later. for example, after selecting the first action to configure the dynamic action button, the system may forward the second action to storage to be carried out at a later time. In some examples, the remaining action is sent to a buffer and used to configure the dynamic action button immediately after the selected action has carried out. In some examples, the remaining action is sent to long term storage and can be used to configured the dynamic action button at any later later.

Figure 3:
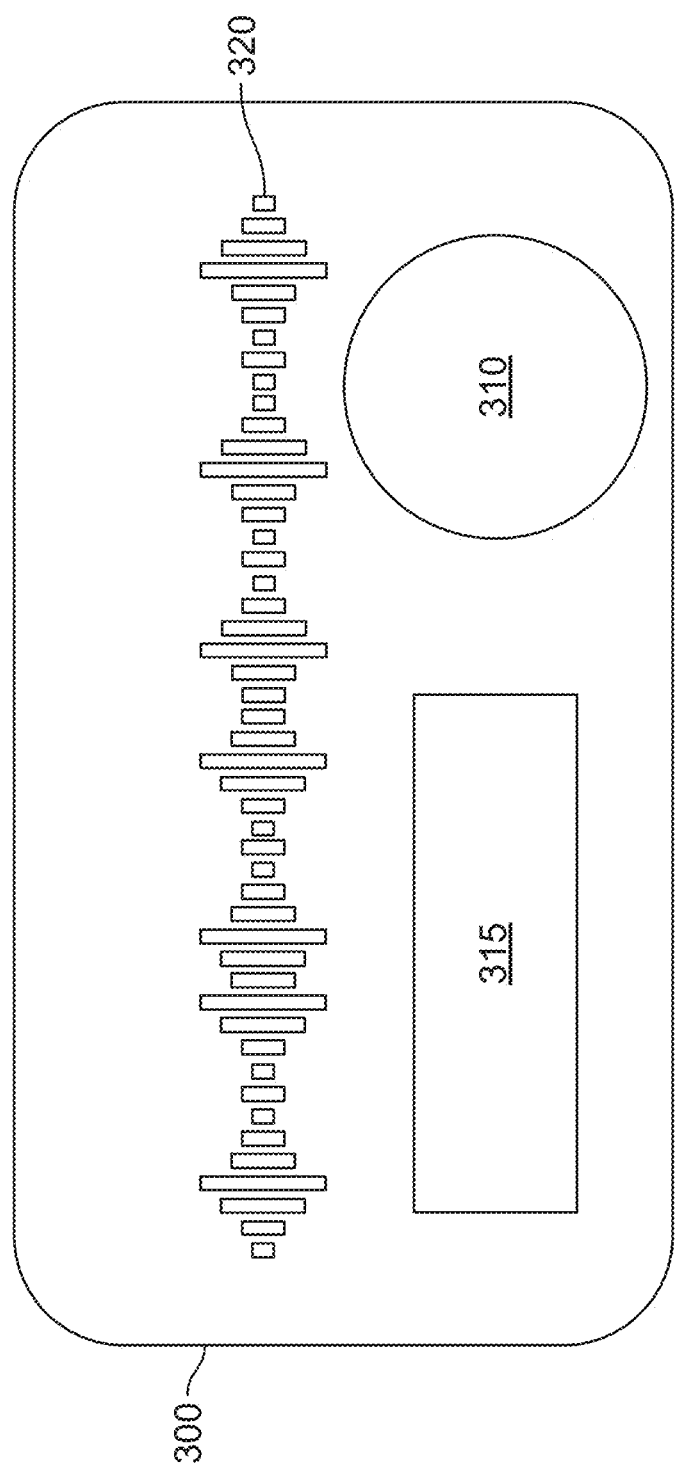
FIGS. 3, 4A, 4B, and 5 illustrate exemplary user interfaces for displaying a dynamic action button, in accordance with some embodiments of the disclosure.
Figure 4:
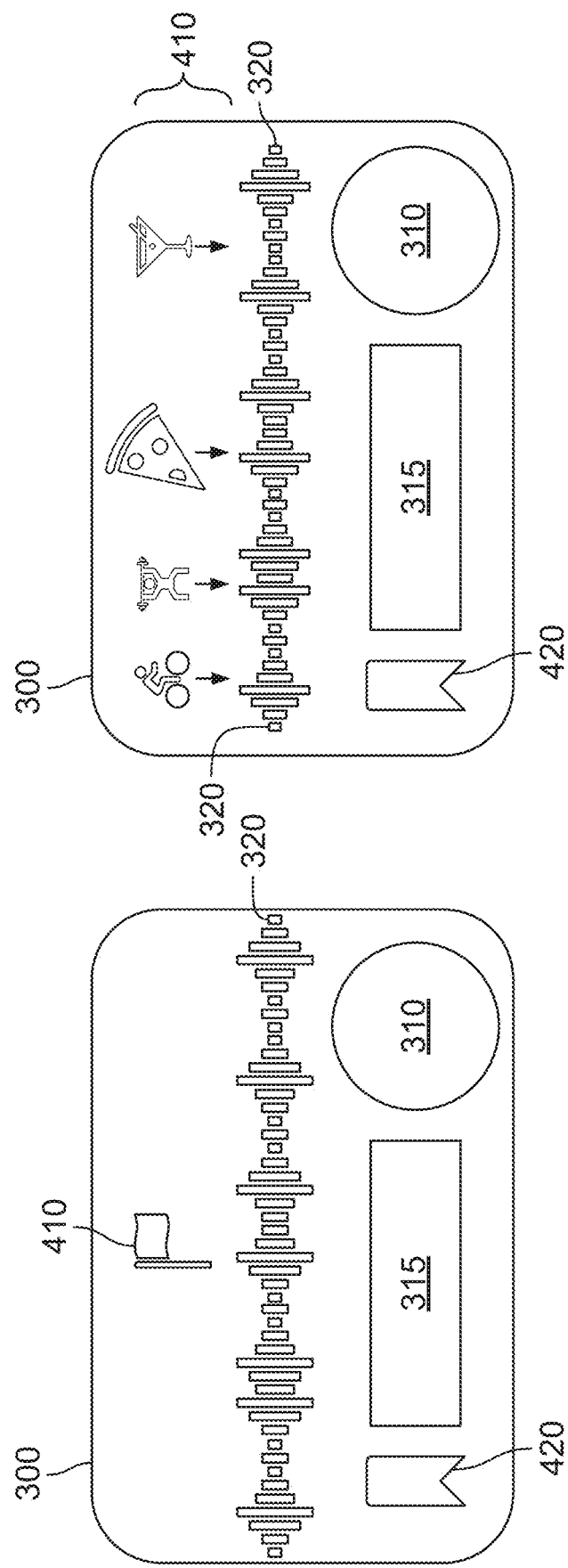
Figure 5:
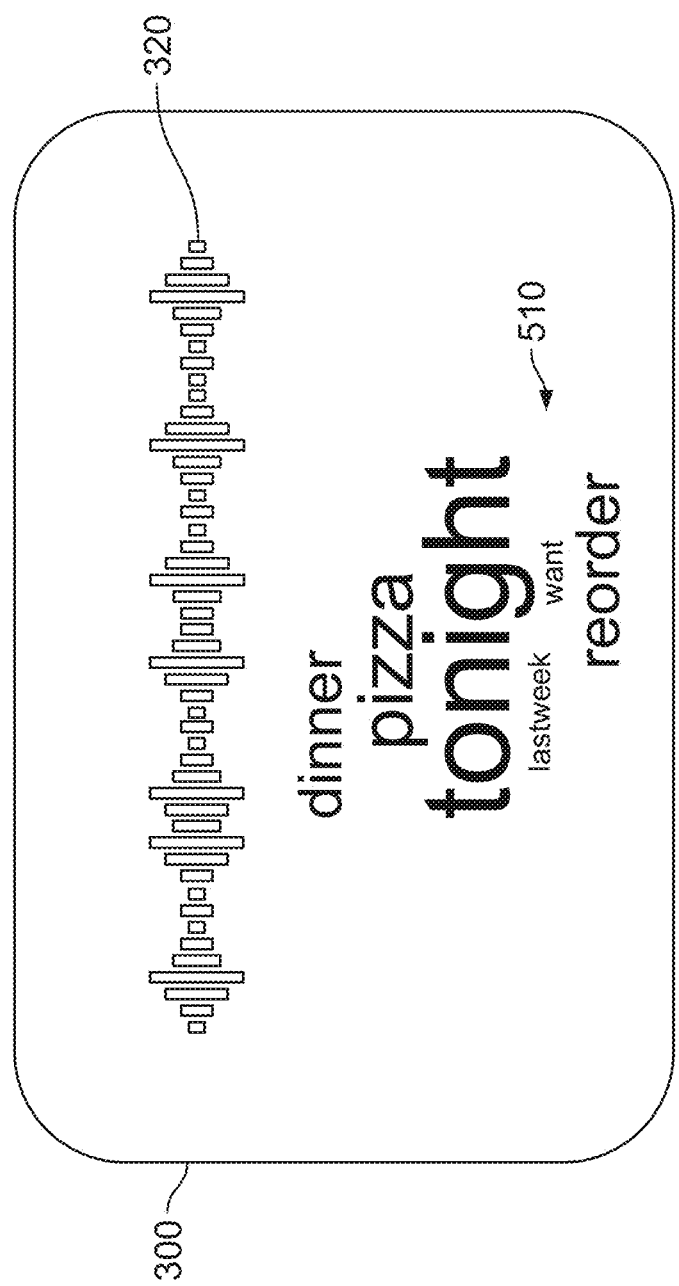

FIGS. 3 to 5 illustrate exemplary user interfaces for displaying a dynamic action button, in accordance with some embodiments of the disclosure. FIG. 3 shows an exemplary user interface 300 comprises a dynamic action button 310. The dynamic action button is selectable by a user. After selection, the media device, system, or control circuitry carries out the methods as described herein. User interface 300 may also comprise an action information box 315, which describes the action that will be carried out after the dynamic action button 310 is selected. User interface 300 may also comprise a representation of the natural language input, shown in FIGS. 3 to 5 as a waveform 320. It should be understood that while user interface 300 in FIGS. 3 to 5 is shown with such features as a waveform 320 a circular dynamic action button 310, these are not intended to be limiting factors to the exemplary user interface 300.

FIGS. 4A and 4B illustrate exemplary user interface for displaying a dynamic action button and flagging positions in a natural language input, in accordance with some embodiments of the disclosure. FIG. 4A shows an exemplary user interface 300, dynamic action button 310, action information box 315, and waveform 320, as described with reference to FIG. 3 above. In addition, FIG. 4A shows a visual indicator 410 that, when selected, takes the user to a point of interest in the natural language input, represented by waveform 320. In some examples, the point of interest shown by visual indicator 410 is associated with the action used to configured dynamic action button 310 and as described by action information box 315. FIG. 4A also shows a bookmark icon 420 that can be used to store the action that will be carried out after selection of the dynamic action button 310.

FIG. 4B shows an exemplary user interface 300, dynamic action button 310, action information box 315, and waveform 320, as described with reference to FIG. 3 above. FIG. 4B shows a bookmark icon 420, as described with reference to FIG. 4A above. However, the visual indicators 415 in FIG. 4B show icons that represent the context of the associated portions of the waveform 320. For example, as shown, the natural language input represented by waveform 320 comprises 4 distinct portions discussing cycling, going to the gym, getting pizza for dinner, and potential getting drinks after dinner. Accordingly, selectable symbols presenting cycling, gym, pizza, and drinks are shown on the user interface 300. In some examples, action or actions can be determined from each of the distinct portions. In some examples, the visual indicators 415 vary in size relative to the importance or priority of the associated section. For example, the pizza icon is larger than the other icons due to the majority of the natural language input discussing pizza tonight for dinner, and this section also comprises a number of questions for the user, which require a response.

Accordingly, the methods may comprise flagging one or more portions of the natural language input associated with an action; and generating for display on the media device a visual indicator at each flagged portion, configured to be selected by a user to review the flagged portion. In some examples, the dynamic action button changes according to the currently selected flagged portion.

In some examples, the system may classify the voice message (i.e., natural language input) as originating from a business entity (e.g., doctor's office). This allows the system to extract such entity and augment the message with additional information, including automatically retrieving a website associated with the doctor's office. In one embodiment, the service verifies that the number that called is actually the doctor's office and displays a "Verified' icon to the user, which is represented by visual indicators 410 or 415, or by action information box 315.

In some examples, an icon that represents the overall sentiment of the message can also be generated and displayed. For example, person A might leave a voicemail for person B that is very generic and concludes with "I love you." In such case, a "heart" icon can be displayed as a visual indicator 410 or 415. The portion of the voice message that is directly related to the icon can be linked to the displayed icon. For example, this allows the user to select on the heart icon to hear "I love you." Additionally, the visual indicators 415 can allow the recipient to retrieve specific information more efficiently without having to listen to the message again. For example, pressing a "time" visual indication 415 takes the user directly to the portion of the voice message that indicates what time the appointment is, as opposed to the user hearing the whole voice message from the beginning. Similarly, the action information box 315 generated based on the natural language input may also include the time of the appointment.

By way of example, if a first portion of the waveform 320 discusses picking up a user's child from day care and a second portion might be asking the user to order Pizza for dinner tonight, or pick up a carton of milk on the way home, the dynamic action button may have a first action with a highest priority for adding a reminder to pick up the child, then a second action with a lower priority the "Order dinner" or 'Pick up Milk". The "pick up milk" reminder action may be stored for later use, which is activated when it is detected that the user is travelling home via GPS based information or the like. After being reminded to pick up the milk on the way home, the user may then be shown the "Order dinner" action, which on selection the user's smartphone orders pizza for delivery via an application on the user's phone. In this example, clicking on the dynamic action button 310 results in the automatic launch of the user's known favourite pizza shop application, reorders a past order, and reminds the user to collect milk all within a few seconds.

In some examples, the system may not order through applications automatically and require user input. In such examples, the dynamic action button 310 can be configured to be "deep-linked," i.e., clicking the dynamic action button 310 automatically launches the user's favourite food delivery app to the pizza food page. This is accomplished by passing the keyword pizza to the application on launch and performing search query (e.g., via an API call). Accordingly, the dynamic action button 310 can be configured to be based on the user's previous actions, browsing/searching history, etc. as well as the context of the natural language input. The dynamic action button is based on context and can leverage existing installed application on the user's device, based on the context category (e.g., shopping, ordering food, etc.). In some examples, when there is no user history information relating to pizza, the dynamic action button 310, on selection, may show a list of popular food or restaurants that the user can browse and order from.

In addition, in some examples, the digital assistant may search and select a piece of promotional material based on the context of the natural language input, or the keywords within the natural language input. In some examples, the system may send the selected piece of promotional material to the user in an electronic message, such as a notification, SMS, email, or in action information box 320.

In some examples, the system provides the user with survey information based on the one or more actions determined from the natural language input. The received survey feedback, which comprises an indication of user preference of the order of actions, can be used to associate the indication of user preference of the actions with the context to give a weighting score.

FIG. 5 illustrates a user interface 300 and waveform 320, as described above with reference to FIGS. 3 to 4B. However, FIG. 5 comprises a word map or word cloud 510, which are a useful and easy way of mapping out the important words in a natural language input. In a word cloud, words that appear more often (excluding very common words such as and, it, the, and the like) appear larger, and often more centrally, concisely summarising the context of the natural language input. In some examples, the words are selectable, after selection, the user is shown one or more instances of the occurrence of that word with visual indicators 410.

Figure 6:
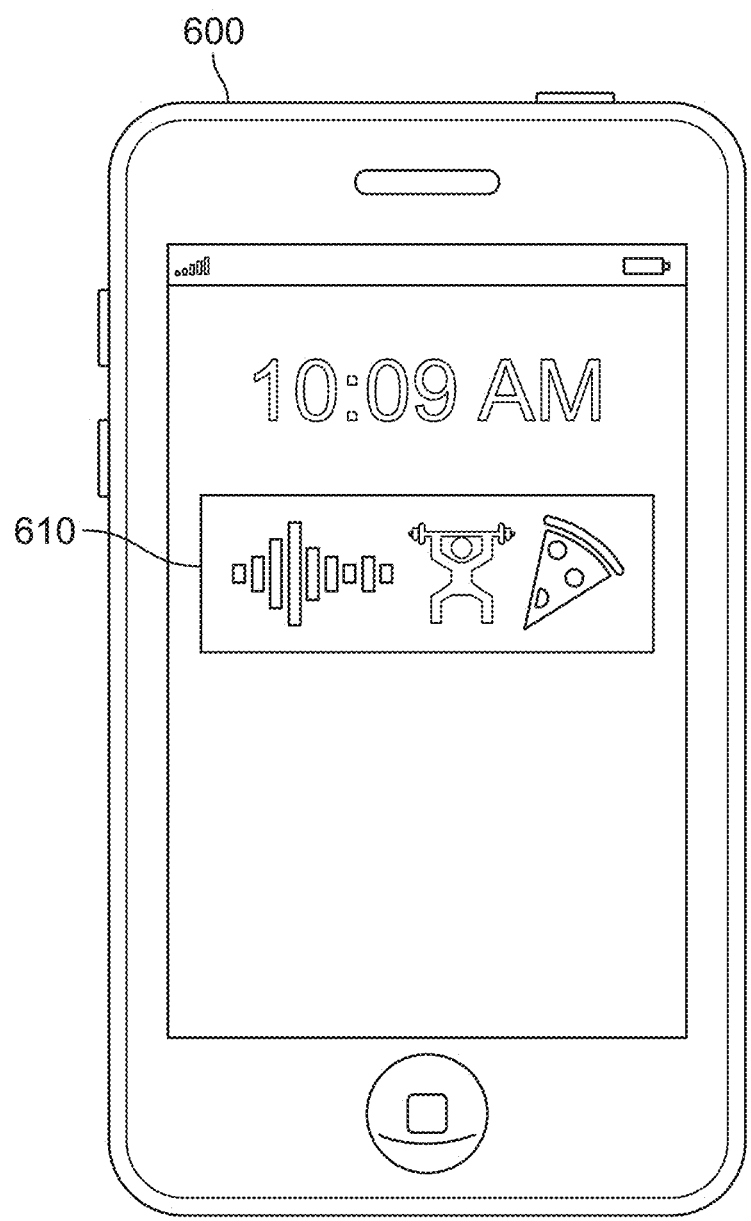
FIG. 6 illustrates an exemplary user interface for displaying a notification and thumbnail of a natural language input, in accordance with some embodiments of the disclosure.

FIG. 6 illustrates an exemplary user interface for displaying a notification and thumbnail of a natural language input, in accordance with some embodiments of the disclosure. FIG. 6 shows a user device 600 with a notification 610. The notification comprises a indication that the notification is a received voice message, voicemail, or the like and, in some examples and as shown in FIG. 6, some visual indicators 310 to indicate the topic of the voice message.

In some examples, the notification may also comprise some text. For example, the text of the notification can include text taken verbatim from the voice message—such as "It is urgent, please call home." Such notifications can also be automatically linked to a "call" action since the notification clearly recite "call."

The text of the notification can be generated locally, i.e., at the user device, or can be generated in response to the voice message transcription service sharing the message metadata with the notification service (e.g., a central push notification service that is used by most apps today). For example, various phrases can be assigned various weights based on content of the phrase using natural language processing, the person who is leaving the message, the sentiment of the phrase, relationship of the caller to the recipient (if known), etc. The phrase with an importance factor that exceeds a threshold can be shared with the notification service with an instruction to use such phrase as the payload of the notification. The call-to-action can also be shared with the notification service. This might include 'call,' 'text,' 'pickup milk,' etc.

Figure 7A:
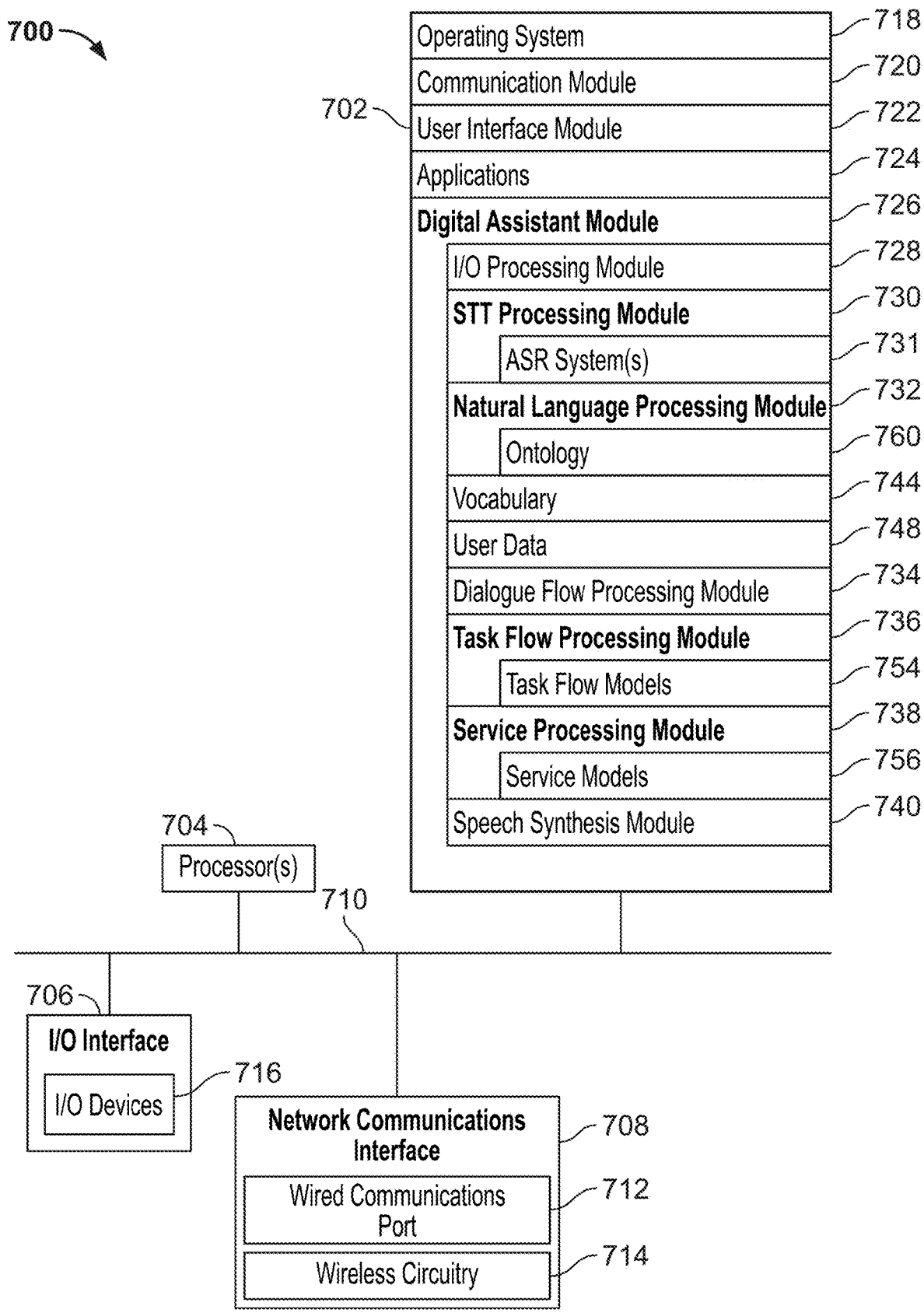
FIG. 7A illustrates a block diagram illustrating a digital assistant system or a server portion thereof, in accordance with some embodiments of the disclosure.

FIG. 7A illustrates a block diagram of digital assistant system 700 in accordance with various examples. In some examples, digital assistant system 700 is implemented on a standalone computer system (e.g., a user's smartphone, tablet, laptop, or the like). In some examples, digital assistant system 700 is distributed across multiple computers. In some examples, some of the modules and functions of the digital assistant are divided into a server portion and a client portion, where the client portion resides on one or more user devices (e.g., devices 600 or 800 of FIGS. 6 & 8) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710. In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices) to carry out the methods herein.

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 800, or 918 in FIGS. 8 and 9, respectively. In some examples, digital assistant system 700 represents the server portion of a digital assistant implementation, and can interact with the user through a client-side portion residing on a user device (e.g., devices 104, 122, 600, or 800).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with transceiver module of electronic devices such as devices 600 and 800 shown in FIGS. 6 and 8, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules has access to one or more of the following systems or data and models of the digital assistant module 726, or a subset or superset thereof: ontology 760, vocabulary index 744, user data 748, task flow models 754, service models 756, and ASR systems.

In some examples, using the processing modules, data, and models implemented in digital assistant module 726, the digital assistant can perform at least some of the following: converting speech input into text; identifying a user's context expressed in a natural language input received from the user; actively eliciting and obtaining information needed to fully infer the user's context (e.g., by disambiguating words, games, contextions, etc.); determining the task flow for fulfilling the inferred context; and executing the task flow to fulfill the inferred context.

Figure 7B:
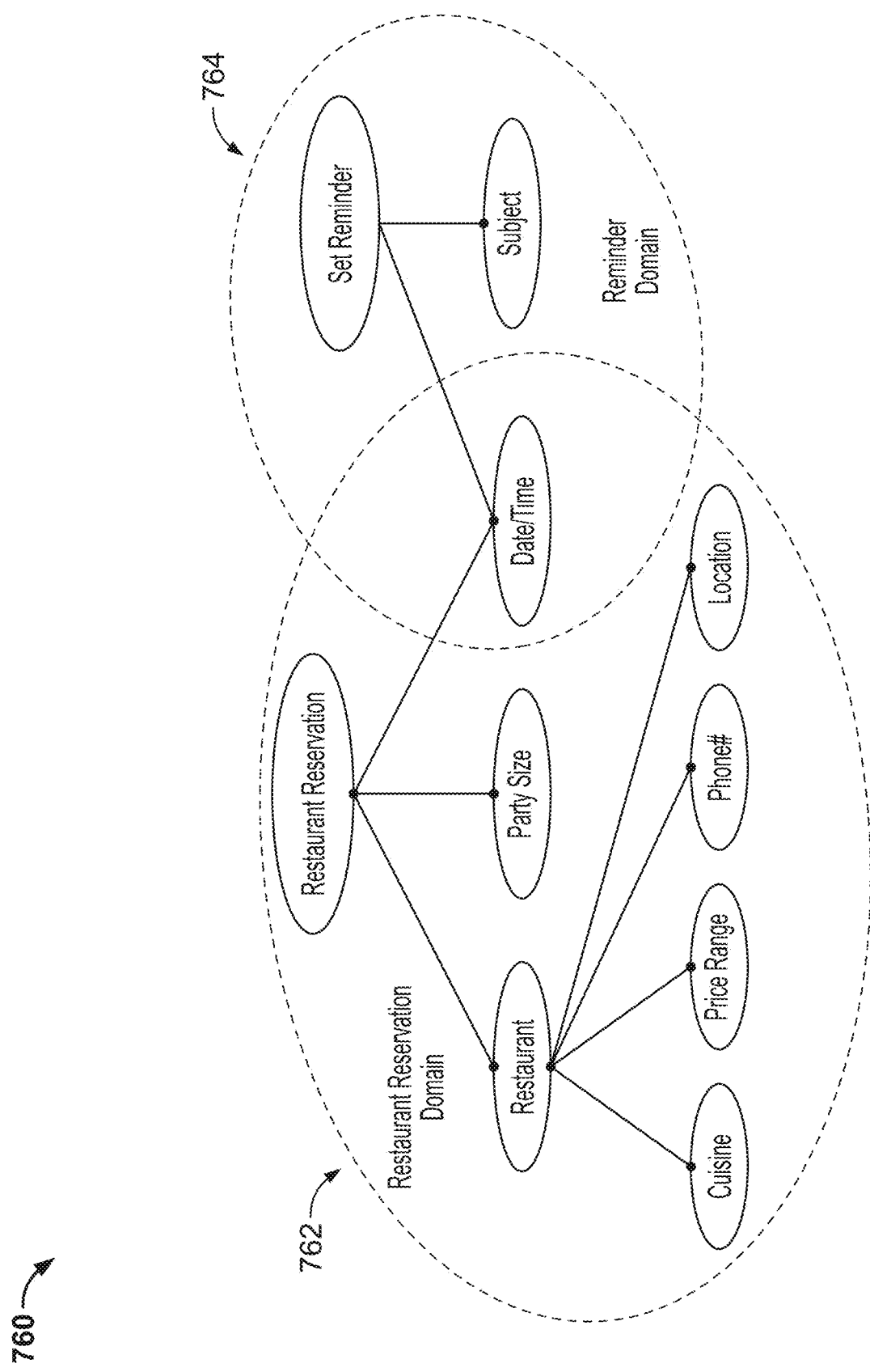
FIG. 7B illustrates a illustrates a portion of a text file or ontology, in accordance with some embodiments of the disclosure.

FIG. 7B illustrates a illustrates a portion of a text file or ontology, in accordance with some embodiments of the disclosure. In some examples, ontology 760 is made up of actionable context nodes and property nodes. Within ontology 760, each actionable context node is linked to one or more property nodes either directly or through one or more intermediate property nodes. Similarly, each property node is linked to one or more actionable context nodes either directly or through one or more intermediate property nodes. For example, as shown in FIG. 7B, ontology 760 includes a "restaurant reservation" node (i.e., an actionable context node). Property nodes "restaurant," "date/time" (for the reservation), and "party size" are each directly linked to the actionable context node (i.e., the "restaurant reservation" node).

In addition, property nodes "cuisine," "price range," "phone number," and "location" are sub-nodes of the property node "restaurant," and are each linked to the "restaurant reservation" node (i.e., the actionable context node) through the intermediate property node "restaurant." For another example, as shown in FIG. 7B, ontology 760 also includes a "set reminder" node (i.e., another actionable context node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable context node, along with its linked concept nodes, is described as a "domain." In the present discussion, each domain is associated with a respective actionable context, and refers to the group of nodes (and the relationships there between) associated with the particular actionable context. For example, ontology 760 shown in FIG. 7B includes an example of restaurant reservation domain 762 and an example of reminder domain 764 within ontology 760. The restaurant reservation domain includes the actionable context node "restaurant reservation," property nodes "restaurant," "date/time," and "party size," and sub-property nodes "cuisine," "price range," "phone number," and "location." Reminder domain 764 includes the actionable context node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7B illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable context node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable contexts) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable contexts are clustered under a "super domain" in ontology 760. For example, a "travel" super-domain includes a cluster of property nodes and actionable context nodes related to travel. The actionable context nodes related to travel includes "airline reservation," "hotel reservation," "car rental," "get directions," "find points of interest," and so on. The actionable context nodes under the same super domain (e.g., the "travel" super domain) have many property nodes in common. For example, the actionable context nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable context represented by the node. The respective set of words and/or phrases associated with each node are the so-called "vocabulary" associated with the node. The respective set of words and/or phrases associated with each node are stored in vocabulary index 744 in association with the property or actionable context represented by the node. For example, the vocabulary associated with the node for the property of "restaurant" includes words such as "food," "drinks," "cuisine," "hungry," "eat," "pizza," "fast food," "meal," and so on. For another example, the vocabulary associated with the node for the actionable context of "initiate a phone call" includes words and phrases such as "call," "phone," "dial," "ring," "call this number," "make a call to," and so on. The vocabulary index 744 optionally includes words and phrases in different languages.

Natural language processing module 732 receives the text strings (e.g., text string(s) or token sequence(s)) from STT processing module 730, and for each candidate representation, determines what nodes are implicated by the words in the text string. In some examples, if a word or phrase in the text string is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable contexts as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user context. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a text string and contextual information associated with the text string. Based on the text string and the associated contextual information, the one or more machine learning mechanism are configured to determine context priority scores over a set of candidate actionable contexts. Natural language processing module 732 can select one or more candidate actionable contexts from the set of candidate actionable contexts based on the determined context priority scores. In some examples, an ontology (e.g., ontology 760) is also used to select the one or more candidate actionable contexts from the set of candidate actionable contexts.

In some examples, once natural language processing module 732 identifies an actionable context (or domain) based on the user request, natural language processing module 732 generates a structured query to represent the identified actionable context. In some examples, the structured query includes parameters for one or more nodes within the domain for the actionable context, and at least some of the parameters are populated with the specific information and requirements specified in the user request. For example, the user says "Make me a dinner reservation at a sushi place at 7." In this case, natural language processing module 732 is able to correctly identify the actionable context to be "restaurant reservation" based on the user input. According to the ontology, a structured query for a "restaurant reservation" domain includes parameters such as (Cuisine), (Time), (Date), (Party Size), and the like. In some examples, based on the speech input and the text derived from the speech input using STT processing module 730, natural language processing module 732 generates a partial structured query for the restaurant reservation domain, where the partial structured query includes the parameters (Cuisine="Sushi") and (Time="7 pm"). However, in this example, the user's utterance contains insufficient information to complete the structured query associated with the domain. Therefore, other necessary parameters such as {Party Size} and {Date} is not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable contexts for each text string received from STT processing module 730. Further, in some examples, a respective structured query (partial or complete) is generated for each identified candidate actionable context. Natural language processing module 732 determines an context priority score for each candidate actionable context and ranks the candidate actionable contexts based on the context priority scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable contexts are provided to task flow processing module 736, where m is a predetermined integer greater than zero. In some examples, the structured query (or queries) for the m-best candidate actionable contexts are provided to task flow processing module 736 with the corresponding text string(s).

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable context.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable context, task flow processing module 736 proceeds to perform the ultimate task associated with the actionable context. Accordingly, task flow processing module 736 executes the steps and instructions in the task flow model according to the specific parameters contained in the structured query. For example, the task flow model for the actionable context of "restaurant reservation" includes steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generate requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and send the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's context, obtain information to further clarify and refine the user context, and finally generate a response (i.e., an output to the user, or the completion of a task) to fulfill the user's context. The generated response is a dialogue response to the speech input that at least partially fulfills the user's context. Further, in some examples, the generated response is output as a speech output. In these examples, the generated response is sent to speech synthesis module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable context. In other examples, the first structured query is selected from the received structured queries based on a combination of the corresponding speech recognition priority scores and the corresponding context priority scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable context. The second structured query is selected, for example, based on the speech recognition priority score of the corresponding text string, the context priority score of the corresponding candidate actionable context, a missing necessary parameter in the first structured query, or any combination thereof.

Speech synthesis module 740 is configured to synthesize speech outputs for presentation to the user. Speech synthesis module 740 synthesizes speech outputs based on text provided by the digital assistant. For example, the generated dialogue response is in the form of a text string. Speech synthesis module 740 converts the text string to an audible speech output. Speech synthesis module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 is configured to synthesize individual words based on phonemic strings corresponding to the words. For example, a phonemic string is associated with a word in the generated dialogue response. The phonemic string is stored in metadata associated with the word. Speech synthesis model 740 is configured to directly process the phonemic string in the metadata to synthesize the word in speech form.

In some examples, instead of (or in addition to) using speech synthesis module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

In some examples, a GPS module (such as network module 830 as described in more detail with regard to FIG. 8) determines the location of the device and provides this information for use in determining an appropriate action. For example, after a voice message is received at the user's media device with the message, "meet me at the corner of $43^{rd}$ and $7^{th}$," the network module 830 may determine a current GPS location (e.g., New York City) and the dynamic action button may be configured to set a route from the current GPS location to the corner of $43^{rd}$ Street and $7^{th}$ Avenue, New York City, New York. In some examples, the network module may look-up a place of interest at the location in the GPS message, e.g., the corner of $43^{rd}$ Street and $7^{th}$ Avenue, New York City comprises a coffee shop.

In some examples, the dynamic action button may be configured to carry out one or more actions based on the natural language input. For example, setting a navigation route to a restaurant and sending an estimated time of arrival (ETA) to the sender of a voice message.

In some examples, digital assistant utilizes the various sensors, subsystems, and peripheral devices of the media device to gather additional information from the surrounding environment of the media device to establish a context factor associated with a user, the current user interaction, and/or the current user input. In some examples, digital assistant client module provides the contextual factors or a subset thereof with the user input to DA server 106 to help infer the user's context. In some examples, the digital assistant also uses the contextual factors to determine how to prepare and deliver outputs to the user.

In some examples, the contextual factors that accompany the user input includes sensor information, e.g., lighting, ambient noise, ambient temperature, images or videos of the surrounding environment, etc. In some examples, the contextual factors can also include the physical state of the device, e.g., device orientation, device location, device temperature, power level, speed, acceleration, motion patterns, cellular signals strength, etc. For example, the digital assistant may establish that the user is walking based on accelerometer information of the media device. In some examples, information related to the software state of DA server 106, e.g., running processes, installed programs, past and present network activities, background services, error logs, resources usage, etc., of media device is provided to DA server 106 as contextual information associated with a user input.

In some examples, the digital assistant selectively provides information (e.g., user data) stored on the portable media device in response to receiving a natural language input. In some examples, digital assistant also elicits additional input from the user via a natural language dialogue or other user interfaces. In some examples, digital assistant passes the additional input to DA server 106 to help DA server 106 in context deduction and/or fulfillment of the user's context expressed in the user request. It should be recognized that digital assistant can include any number of the sub-modules of digital assistant module 726 described above.

FIG. 8 illustrates an exemplary media device 800, in accordance with some embodiments of the disclosure. The media device 800 comprises a transceiver module 810, a control module 820, and a network module 830. The media transmission system may communicate with an additional user device 835, such as a home game way, smartphone, or other smart devices, and receive the notification from those other devices.

In some examples, the transceiver module 810 is configured to receive, from at least one application on the media device, a natural language input. In some examples, the natural language input may originate from a server such as server 902, as described with reference to FIG. 9.

In some examples, the control module 820 is coupled to the transceiver module 810 and the network module 830. In some examples, the control module 820 is adapted to: determine, based on the natural language input, a first context of the natural language input; and determine, based on the first context, a first action. Thereafter, the control module 820 is adapted to carrying out an action, in response to a user input. For example, the user may select a dynamic action button and the control module carries out the first action.

In some examples, the network module 830 is coupled with the transceiver module. In some examples, the network module 830 is configured to download the natural language. In some examples, the natural language input originates from a cellular call and is then stored on the media device. For example, the network module may be connected to a server, such as server 902 as described with FIG. 9, and download the natural language input.

In some examples, the transceiver module communicates with a second user device 835 via communication link 818. The communication link 818 between the transceiver module 810 and the second user device 835 may comprise a physical connection, facilitated by an input port such as a 3.5 mm jack, RCA jack, USB port, ethernet port, or any other suitable connection for communicating over a wired connection or may comprise a wireless connection via BLUETOOTH, Wi-Fi, WiMAX, Zigbee, GSM, UTMS, CDMA, TDMA, 3G, 4G, 4G LTE, 5G or other wireless transmissions as described by the relevant 802.11 wireless communication protocols.

In some examples, the communication link 818 is between the media device 800 and a home gateway device, which is in turn in communication with the second user device 835. In some examples, the home gateway device may receive the natural language input and then transmit the natural language input to the second user device 835. However, these examples are considered to be non-limiting and other combinations of the features herein being spread over two or more devices are considered within the scope of this disclosure. For example, each of the transceiver module, the network module, and the control module may be separate internet of things (IoT) devices that each carry out a portion of the methods herein. Collectively, these devices may be referred to as a system.

Figure 9:
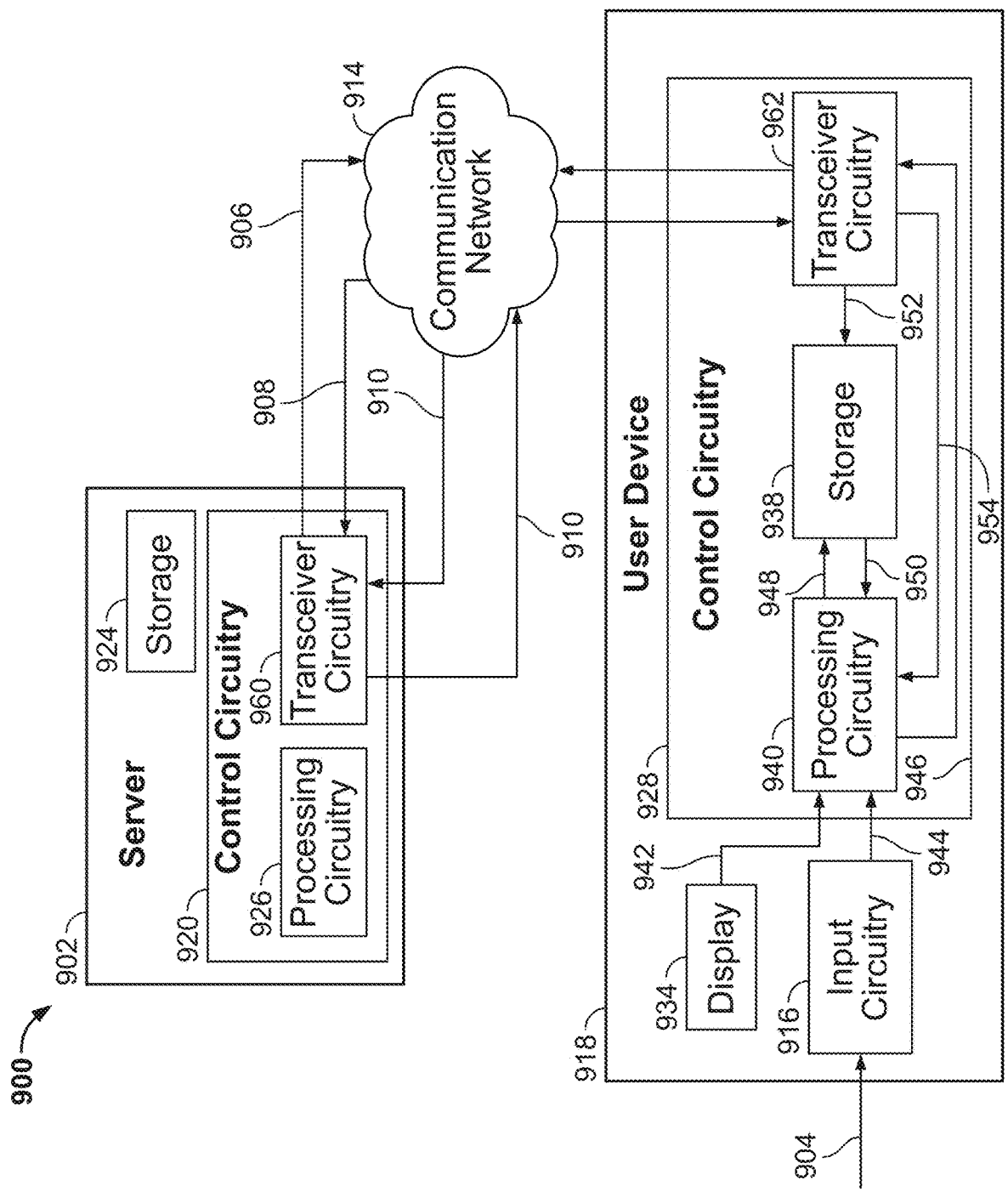
FIG. 9 is a block diagram representing devices, components of each device, and data flow therebetween for an adaptive video streaming system, in accordance with some embodiments of the disclosure.

FIG. 9 is a block diagram representing devices, components of each device, and data flow therebetween for an adaptive video streaming system, in accordance with some embodiments of the disclosure. System 900 is shown to include a client device 918, a server 902, and a communication network 914. It is understood that while a single instance of a component may be shown and described relative to FIG. 9, additional instances of the component may be employed. For example, server 902 may include or may be incorporated in, more than one server. Similarly, communication network 914 may include or may be incorporated in, more than one communication network. Server 902 is shown communicatively coupled to client device 918 through communication network 914. While not shown in FIG. 9, server 902 may be directly communicatively coupled to client device 918, for example, in a system absent or bypassing communication network 914. Client device 918 may be thought of as the media device 700 or 800 as described above.

In some examples, as described above, the natural language input is selectable and the user can interact with it after receiving. The natural language input may be stored uploading on a server such as server 902. The server 902 may comprises information regarding the streaming of the natural language input, or any of the results of the processing thereafter media on a user device or another network device. For example, a user device or a network device (e.g., a laptop, PC, smartphone, smart TV, or the like) may be provided with a natural language input by a media server 902 and, after the user interacts with the natural language input, the engagement information may be retrieved or received from the user device. In some examples, the natural language input is provided as an adaptive bitrate stream compatible with the MPEG-DASH standard, or other implementations such as Apple HLS. In some examples, the media content is encoded using an adaptive bitrate streaming compatible codec. There are numerous examples of video codecs that are adaptive bitrate streaming compatible (e.g., x264, OpenH264, H.264/MPEG-4 AVC, which are all codecs compatible with the video format H.264). Moreover, there are numerous examples of video formats (e.g., H.264, H.265, VP9, AV1), each of which has numerous examples of video codecs.

Communication network 914 may comprise one or more network systems, such as, without limitation, an internet, LAN, WIFI, or other network systems suitable for audio processing applications. In some embodiments, system 900 excludes server 902, and functionality that would otherwise be implemented by server 902 is instead implemented by other components of system 900, such as one or more components of communication network 914. In still other embodiments, server 902 works in conjunction with one or more components of communication network 914 to implement certain functionality described herein in a distributed or cooperative manner. Similarly, in some embodiments, system 900 excludes client device 918, and functionality that would otherwise be implemented by the client device 918 is instead implemented by other components of system 900, such as one or more components of communication network 914 or server 902 or a combination. In still other embodiments, the client device 918 works in conjunction with one or more components of communication network 914 or server 902 to implement certain functionality described herein in a distributed or cooperative manner.

The client device 918 includes control circuitry 928, display 934, and input-output circuitry 916. Control circuitry 928 in turn includes transceiver circuitry 962, storage 938, and processing circuitry 940. In some embodiments, client device 918 or control circuitry 928 may be configured as user device 935 of FIG. 9.

Server 902 includes control circuitry 920 and storage 924. Each of the storages 924 and 938 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 924, 938 may be used to store various types of content, media data, and or other types of data (e.g., they can be used to store media content such as audio, video, and advertisement data). The non-volatile memory may also be used (e.g., to launch a boot-up routine and other instructions). Cloud-based storage may be used to supplement storages 924, 938 or instead of storages 924, 938. In some embodiments, the pre-encoded or encoded media content, in accordance with the present disclosure, may be stored on one or more of storages 924, 938.

In some embodiments, control circuitry 920 and/or 928 executes instructions for an application stored on the memory (e.g., storage 924 and/or storage 938). Specifically, control circuitry 920 and/or 928 may be instructed by the application to perform the functions discussed herein. In some implementations, any action performed by control circuitry 920 and/or 928 may be based on instructions received from the application. For example, the application may be implemented as software or a set of executable instructions that may be stored on storage 924 and/or 938 and executed by control circuitry 920 and/or 928. In some embodiments, the application may be a client/server application where only a client application resides on client device 918, and a server application resides on server 902.

The application may be implemented using any suitable architecture. For example, it may be a stand-alone application wholly implemented on client device 918. In such an approach, instructions for the application are stored locally (e.g., in storage 938), and data for use by the application is downloaded periodically (e.g., from an out-of-band feed, from an internet resource, or using another suitable approach). Control circuitry 928 may retrieve instructions for the application from storage 938 and process the instructions to perform the functionality described herein. Based on the processed instructions, control circuitry 928 may determine a type of action to perform in response to input received from the input/output path (or input-output circuitry) 916 or the communication network 914. For example, in response to a receiving a natural language input on the client device 918, control circuitry 928 may perform the steps of processes as described with reference to various examples discussed herein.

In client/server-based embodiments, control circuitry 928 may include communication circuitry suitable for communicating with an application server (e.g., server 902) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 914). In another example of a client/server-based application, control circuitry 928 runs a web browser that interprets web pages provided by a remote server (e.g., server 902). For example, the remote server may store the instructions for the application in a storage device. The remote server may process the stored instructions using circuitry (e.g., control circuitry 928) and/or generate displays. Client device 918 may receive the displays generated by the remote server and may display the content of the displays locally via display 934. This way, the processing of the instructions is performed remotely (e.g., by server 902) while the resulting displays, such as the display windows described elsewhere herein, are provided locally on the client device 918. Client device 918 may receive inputs from the user via input circuitry 916 and transmit those inputs to the remote server for processing and generating the corresponding displays. Alternatively, client device 918 may receive inputs from the user via input circuitry 916 and process and display the received inputs locally, by control circuitry 928 and display 934, respectively.

Server 902 and client device 918 may transmit and receive content and data such as media content via communication network 914. For example, server 902 may be a media content provider, and client device 918 may be a smart television configured to download or stream media content, such as a YouTube video, from server 902. Control circuitry 920, 928 may send and receive commands, requests, and other suitable data through communication network 914 using transceiver circuitry 960, 962, respectively. Control circuitry 920, 928 may communicate directly with each other using transceiver circuitry 960, 962, respectively, avoiding communication network 914.

It is understood that client device 918 is not limited to the embodiments and methods shown and described herein. In non-limiting examples, the client device 918 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, client equipment, or wireless device, and/or combination of the same capable of suitably displaying and manipulating media content.

Control circuitry 920 and/or 918 may be based on any suitable processing circuitry such as processing circuitry 926 and/or 940, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 920 and/or control circuitry 918 are configured to implement a media content operation system, such as systems, or parts thereof, that perform various media content manipulation processes described herein.

Client device 918 receives a user input 904 at input circuitry 916. For example, client device 918 may receive a user input like a user swipe or user touch, as previously discussed. In some embodiments, client device 918 is a media device (or player), with the capability to access media content. It is understood that client device 918 is not limited to the embodiments and methods shown and described herein. In non-limiting examples, the client device 918 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 904 may be received from a user selection-capturing interface that is separate from device 918, such as a remote-control device, trackpad, or any other suitable user movement sensitive or capture devices, or as part of device 918, such as a touchscreen of display 934. Transmission of user input 904 to client device 918 may be accomplished using a wired connection, such as an audio cable, USB cable, ethernet cable, or the like attached to a corresponding input port at a local device, or may be accomplished using a wireless connection, such as BLUETOOTH, Wi-Fi, WiMAX, ZIGBEE, GSM, UTMS, CDMA, TDMA, 3G, 4G, 4G LTE, or any other suitable wireless transmission protocol. Input circuitry 916 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi-Fi, WiMAX, ZIGBEE, GSM, UTMS, CDMA, TDMA, 3G, 4G, 4G LTE, or other wireless transmission protocols.

Processing circuitry 940 may receive input 904 from input circuit 916. Processing circuitry 940 may convert or translate the received user input 904 that may be in the form of gestures or movement to digital signals. In some embodiments, input circuit 916 performs the translation to digital signals. In some embodiments, processing circuitry 940 (or processing circuitry 926, as the case may be) carries out disclosed processes and methods.

Accordingly, herein systems and methods for providing contextual based actions based on a natural language input are disclosed. The method comprises: receiving, on a media device, a natural language input; determining, based on the natural language input, a first context of the natural language input; and determining, based on the first context, a first action. a dynamic action button is generated and configured to be selected by a user to carry out an action, and in response to the user selecting the dynamic action button, the systems and methods describe carrying out the first action.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for providing contextual based actions based on a natural language input, the method comprising:
  receiving, at a media device, a natural language input;
  determining, based at least in part on the natural language input, a first context of the natural language input;
  determining, based at least in part on the first context, a first action associated with a first portion of the natural language input and a second action associated with a second portion of the natural language input;
  calculating a first priority score of the first action and a second priority score of the second action, wherein the first priority score and the second priority score are calculated based on a vocal tone of the natural language input;
  determining that the first action is of higher priority than the second action based on the first priority score being greater than the second priority score;
  generating a first visual icon representing the first action;
  generating a second visual icon representing the second action;
  generating for display on the media device:
    a waveform of the natural language input;

the first visual icon representing the first action adjacent to a first segment of the waveform corresponding to the first portion of the natural language input;
the second visual icon representing the second action adjacent to a second segment of the waveform corresponding to the second portion of the natural language input; and
a dynamic action button configured to carry out the first action;
receiving a selection of the second visual icon adjacent to the second segment of the waveform corresponding to the second portion of the natural language input; and
based on receiving the selection of the second visual icon adjacent to the second segment of the waveform corresponding to the second portion of the natural language input, updating the dynamic action button to perform the second action.

2. The method of claim 1, further comprising:
providing the user with survey information based on the first action and second action;
receiving survey feedback comprising an indication of user preference of the first action or second action;
associating the indication of user preference of the first action or second action with the first context; and
assigning a weighting to the first context.

3. The method of claim 1, further comprising:
providing the action with the lowest priority score to another media device.

4. The method of claim 1, further comprising:
providing a text string based on the natural language input, wherein the first context is determined based on the text string.

5. The method of claim 4, further comprising:
selecting a plurality of keywords from the text string; and
searching the media device for associated data based on the text string,
wherein the associated data is used in determining the first context of the natural language input.

6. A media device, comprising a control module, a transceiver module and a network module, configured to:
receive, at a media device, a natural language input;
determine, based at least in part on the natural language input, a first context of the natural language input;
determine, based at least in part on the first context, a first action associated with a first portion of the natural language input and a second action associated with a second portion of the natural language input;
calculate a first priority score of the first action and a second priority score of the second action, wherein the first priority score and the second priority score are calculated based on a vocal tone of the natural language input;
determine that the first action is of higher priority than the second action based on the first priority score being greater than the second priority score;
generate a first visual icon representing the first action;
generate a second visual icon representing the second action
generate for display on the media device:
a waveform of the natural language input;
the first visual icon representing the first action adjacent to a first segment of the waveform corresponding to the first portion of the natural language input;
the second visual icon representing the second action adjacent to a second segment of the waveform corresponding to the second portion of the natural language input; and
a dynamic action button configured to carry out the first action;
receive a selection of the second visual icon adjacent to the second segment of the waveform corresponding to the second portion of the natural language input; and
based on receiving the selection of the second visual icon adjacent to the second segment of the waveform corresponding to the second portion of the natural language input, update the dynamic action button to perform the second action.

7. The media device of claim 6, further configured to:
provide the user with survey information based on the first action and second action;
receive survey feedback comprising an indication of user preference of the first action or second action;
associate the indication of user preference of the first action or second action with the first context; and
assign a weighting to the first context.

8. The media device of claim 6, further configured to:
provide the action with the lowest priority score to another media device.

9. The media device of claim 6, further configured to:
provide a text string based on the natural language input, wherein the first context is determined based on the text string.

10. The media device of claim 9, further configured to:
select a plurality of keywords from the text string; and
search the media device for associated data based on the text string,
wherein the associated data is used in determining the first context of the natural language input.

11. A system for providing contextual based actions based on a natural language input, the system comprising:
means for receiving, at a media device, a natural language input;
means for determining, based at least in part on the natural language input, a first context of the natural language input;
means for determining, based at least in part on the first context, a first action associated with a first portion of the natural language input and a second action associated with a second portion of the natural language input;
means for calculating a first priority score of the first action and a second priority score of the second action, wherein the first priority score and the second priority score are calculated based on a vocal tone of the natural language input;
means for determining that the first action is of higher priority than the second action based on the first priority score being greater than the second priority score;
means for generating a first visual icon representing the first action;
means for generating a second visual icon representing the second action;
means for generating for display on the media device:
a waveform of the natural language input;
the first visual icon representing the first action adjacent to a first segment of the waveform corresponding to the first portion of the natural language input;
the second visual icon representing the second action adjacent to a second segment of the waveform corresponding to the second portion of the natural language input; and
a dynamic action button configured to carry out the first action;

means for receiving a selection of the second visual icon adjacent to the second segment of the waveform corresponding to the second portion of the natural language input; and based on receiving the selection of the second visual icon adjacent to the second segment of the waveform corresponding to the second portion of the natural language input, means for updating the dynamic action button to perform the second action.

12. The method of claim 1, further comprising:

determining a level of urgency associated with the natural language input, wherein the level of urgency is determined based on the vocal tone of the natural language input.

13. The method of claim 12, further comprising:

retrieving metadata associated with a previously received natural language input, wherein the level of urgency is based on the retrieved metadata.

14. The method of claim 1, wherein the natural language input is a first natural language input, the method further comprising:

receiving a second natural language input;

determining, based on the second natural language input, a second context of the second natural language input;

determining, based on the second context, a third action and a fourth action; and calculating, based on a keyword database that comprises a list of keywords known to indicate urgency, a third priority score of the third action and a fourth priority score of the fourth action.

15. The method of claim 1, further comprising:

storing the action with the lowest priority score in a storage, wherein the stored action can be accessed to be carried out at a later time.

16. The media device of claim 6, further configured to:

determine a level of urgency associated with the natural language input, wherein the level of urgency is determined based on the vocal tone of the natural language input.

17. The media device of claim 16, further configured to:

retrieve metadata associated with a previously received natural language input, wherein the level of urgency is based on the retrieved metadata.

18. The method of claim 1, wherein a first size of the first visual indicator is based the first priority score, and a second size of the second visual indicator is based on the second priority score.

19. The method of claim 1, wherein:

the second visual indicator is arranged directly on top of the second segment of the waveform corresponding to the second portion of the natural language input; and the second visual indicator is arranged directly on top of the second segment of the waveform corresponding to the second portion of the natural language input.

20. The method of claim 1, wherein:

the dynamic action button, when configured to perform the first action, is displayed with a first appearance;

the dynamic action button, when configured to perform the second action, is displayed with a second appearance different from the first appearance; and the dynamic action button is displayed in a same location on a display of the media device when configured to perform both the first action and the second action.

* * * * *